(12) United States Patent
Vainio et al.

(10) Patent No.: US 7,546,366 B2
(45) Date of Patent: Jun. 9, 2009

(54) DATA COLLECTION IN A COMPUTER CLUSTER

(75) Inventors: Jukka A. Vainio, Lieto (FI); Teemu V. Jalonen, Helsinki (FI)

(73) Assignee: Nokia Corporation, Espoo (FI)

( * ) Notice: Subject to any disclaimer, the term of this patent is extended or adjusted under 35 U.S.C. 154(b) by 833 days.

(21) Appl. No.: 10/630,972

(22) Filed: Jul. 31, 2003

(65) Prior Publication Data

US 2004/0243702 A1 Dec. 2, 2004

(30) Foreign Application Priority Data

May 27, 2003 (FI) .................................. 20030796

(51) Int. Cl.
*G06F 15/173* (2006.01)
(52) U.S. Cl. ...................... 709/224; 709/225; 709/206; 709/207; 370/252; 370/254
(58) Field of Classification Search ................. 709/224
See application file for complete search history.

(56) References Cited

U.S. PATENT DOCUMENTS

| | | | | |
|---|---|---|---|---|
| 5,649,100 | A * | 7/1997 | Ertel et al. | 709/225 |
| 5,778,185 | A | 7/1998 | Gregerson et al. | |
| 6,016,500 | A * | 1/2000 | Waldo et al. | 709/217 |
| 6,199,099 | B1 * | 3/2001 | Gershman et al. | 709/203 |
| 6,311,217 | B1 * | 10/2001 | Ehlinger et al. | 709/226 |
| 6,609,213 | B1 | 8/2003 | Nguyen et al. | |
| 6,721,907 | B2 * | 4/2004 | Earl | 714/57 |
| 6,728,780 | B1 * | 4/2004 | Hebert | 709/239 |
| 6,961,763 | B1 * | 11/2005 | Wang et al. | 709/223 |
| 7,035,918 | B1 * | 4/2006 | Redding et al. | 709/223 |

(Continued)

FOREIGN PATENT DOCUMENTS

| | | |
|---|---|---|
| JP | H09-319720 | 12/1997 |
| JP | 2003-099290 | 4/2003 |
| WO | 98/12837 | 3/1998 |

OTHER PUBLICATIONS

Zandy, Victor et al. "Reliable Network Connections." MOBICOM '02. Sep. 2002. Atlanta, GA. ACM Press, 2002. 95-106.*
Castro, Miguel et al. "SplitStream: High-Bandwidth Multicast in Cooperative Environments." SOSP '03. Oct. 2002. Bolton Landing, NY. ACM Press, 2003. 298-313.*

(Continued)

*Primary Examiner*—Larry D Donaghue
*Assistant Examiner*—Jeffrey R Swearingen
(74) *Attorney, Agent, or Firm*—Squire, Sanders & Dempsey L.L.P.

(57) ABSTRACT

A mechanism for transferring state information in a computer cluster having a plurality of computer nodes is disclosed. In the method, heartbeat messages are sent periodically from a first computer node of the computer cluster to other computer nodes of the cluster. Each of the other nodes includes at least one resource for performing at least one cluster-specific task. In order that up-to-date state information may be collected even in large clusters about the ability of the resources to perform the cluster-specific tasks, without excessively loading the computer nodes and the network, current state information is returned in a heartbeat acknowledgment message to the node that sent the heartbeat message.

15 Claims, 3 Drawing Sheets

U.S. PATENT DOCUMENTS

| | | | |
|---|---|---|---|
| 7,193,971 B2 * | 3/2007 | McClellan | 370/238 |
| 7,430,593 B2 * | 9/2008 | Baldwin et al. | 709/223 |
| 2002/0169867 A1 * | 11/2002 | Mann et al. | 709/224 |
| 2003/0018930 A1 | 1/2003 | Furr | |
| 2003/0233594 A1 | 12/2003 | Earl et al. | |

OTHER PUBLICATIONS

Butt, Ali Raza et al. "Economical Fault-Tolerant Networks." Linux Journal. Jun. 2000. vol. 2000 Issue 74es. Specialized Systems Consultants, Inc. 6 pages.*

* cited by examiner

DATA COLLECTION IN A COMPUTER CLUSTER

BACKGROUND OF THE INVENTION

1. Field of the Invention

The present invention relates generally to computer clusters that include a plurality of computer nodes. More particularly, the present invention relates to a mechanism for collecting state information within the cluster. In this context, state information refers to data that indicates how the resources of a computer node are able to complete their tasks in the cluster. The state information may thus include, not only data indicating the current load of the various resources of a computer node, but also data about the current performance or capacity of the resources in the computer node, i.e. data about the current ability of the resources to complete their tasks in the cluster.

2. Description of the Related Art

As is commonly known, a computer cluster is a group of computers working together to complete one or more tasks. Computer clusters can be used for load balancing, for improved fault tolerance (i.e., for improved availability in case of failures), or for parallel computing, for example.

A typical computer cluster comprises a plurality of computer nodes. A computer node here refers to an entity provided with a dedicated processor, memory, and operating system, as well as with a network interface through which it can communicate with other computer nodes of the cluster. At least one of the computer nodes in the cluster is capable of acting as a manager node that manages the cluster. In order to detect failures in the cluster, the manager node sends certain messages, called heartbeats, periodically to the other computer nodes in the cluster. Typically, only one computer node at a time acts as a manager node.

Control software, residing typically in the manager node, has to monitor all computer nodes that belong to the cluster. In order to get a true and up-to-date picture of the state of the nodes, the control software has to collect state information at a fairly high frequency from the nodes. This is a problem especially in large computer clusters, which may contain tens, or even hundreds of computer nodes. In these large computer clusters the data collection rate has to be compromised in favor of the performance of the network and the computer nodes, to ensure that the network does not become congested due to the data collection and that the performance of the computer nodes remains at an acceptable level despite the data collection performed. In other words, in large clusters the data collection rate has to be compromised in order not to degrade the performance of the network or the computer nodes excessively.

The objective of the present invention is to eliminate or alleviate this drawback.

SUMMARY OF THE INVENTION

The invention seeks to bring about a novel mechanism for collecting state information from the computer nodes of a computer cluster. The invention seeks to provide a mechanism that does not require the collection rate of the state information to be compromised in favor of network or node performance even in large clusters.

In the present invention, an internal property of a computer cluster, the heartbeat mechanism, is utilized for collecting state information from the computer nodes for monitoring and control purposes. As described below, the collected state information may be utilized either internally in the computer cluster or by an outside entity, such as a network monitoring or management system.

According to one embodiment of the invention, a method for transferring state information in a computer cluster uses a plurality of computer nodes. The method includes the steps of transmitting a heartbeat message from a first computer node of a computer cluster to a second computer node of the computer cluster, where the second computer node includes at least one resource for performing at least one cluster-specific task and receiving the heartbeat message in the second computer node. The method also includes retrieving state information for a heartbeat acknowledgment message to be sent as a response to the heartbeat message, the state information indicating the ability of the at least one resource to perform the at least one cluster-specific task and sending the state information in the heartbeat acknowledgment message to the first computer node.

In another embodiment, the invention provides a computer cluster having a plurality of computer nodes. The computer cluster includes first means for transmitting a heartbeat message from a first computer node of the computer cluster to a second computer node of the computer cluster, where the second computer node includes at least one resource for performing at least one cluster-specific task, and second means for receiving the heartbeat message in the second computer node. The computer cluster also includes third means for retrieving state information for a heartbeat acknowledgment message to be sent as a response to the heartbeat message, the state information indicating the ability of the at least one resource to perform the at least one cluster-specific task and fourth means for sending the state information in the heartbeat acknowledgment message to the first computer node.

In another embodiment, the invention provides a computer node for a computer cluster. The computer node includes at least one resource for performing at least one cluster-specific task, first means for receiving a heartbeat message from another computer node, second means for retrieving state information for a heartbeat acknowledgment message to be sent as a response to the heartbeat message, the state information indicating the ability of the at least one resource to perform the at least one cluster-specific task and third means, responsive to the second means, for sending the state information in the heartbeat acknowledgment message to the another computer node.

By means of the invention, real-time state information can be collected from the computer nodes of a computer cluster without excessively loading the network or the computer nodes, i.e. the information collection rate does not need to be compromised due to the load the collection causes. The overhead caused by the increased length of the acknowledgment message is relatively low, especially if the length of the minimum transmission unit is not exceeded.

In one embodiment of the invention, a computer node receiving a heartbeat message checks whether state information is to be retrieved for the heartbeat acknowledgment message to be sent as a response to the heartbeat message. In this way, unnecessary transfer of state information can be avoided.

A further advantage of the invention is that the collected information may be simultaneously utilized by different entities within or outside of the computer cluster.

Other features and advantages of the invention will become apparent through reference to the following detailed description and accompanying drawings.

BRIEF DESCRIPTION OF THE DRAWINGS

In the following, the invention and its preferred embodiments are described more closely with reference to the examples shown in FIG. 1 to 5 in the appended drawings, wherein.

DETAILED DESCRIPTION OF THE PREFERRED EMBODIMENT(S)

Figure 1:
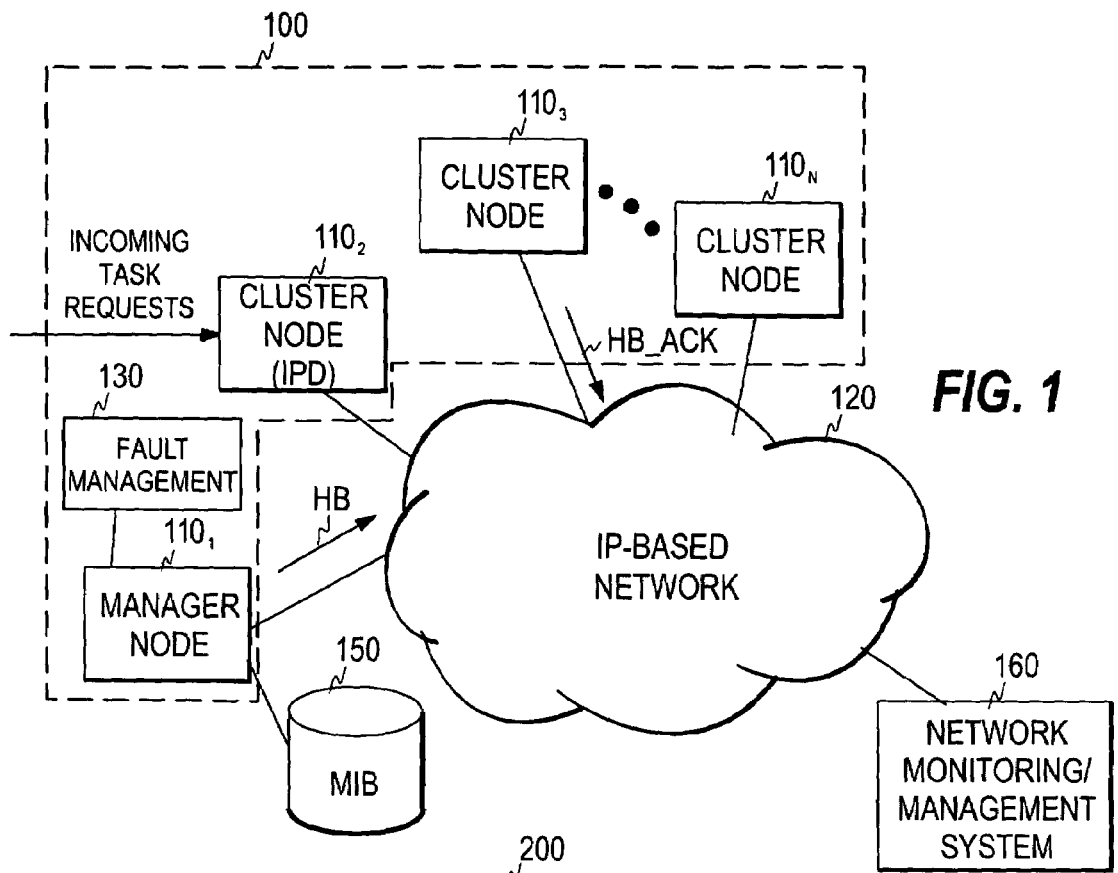
FIG. 1 illustrates one computer cluster according to the invention.

FIG. 1 shows an example of a computer cluster 100 in which the mechanism of the invention is utilized. The cluster comprises N computer nodes $110_i$ (i=1, 2, 3, . . . N). Each computer node is an independent entity provided with a processor, memory and an operating system copy of its own. Each computer node is further provided with a network interface for connecting it to a network 120, which is typically an Internet Protocol (IP) based network. It is to be noted here that the mechanism of the invention is not dependent on the transmission protocol, but may be applied in many different environments. However, an IP network forms a typical environment for the invention.

At each time, one of the computer nodes, in this example node $110_1$, operates as a manager node that manages the cluster and its resources. In order to detect failures occurring in the cluster, the manager node sends heartbeat messages HB periodically to the other computer nodes in the cluster. Although the cluster may include more than one node being able to act as a manager node, one of such nodes operates as the manager node at a time. A single heartbeat message is typically a multicast message destined for all nodes of the cluster, and the period between two successive heartbeat messages depends greatly on the application environment.

When a computer node receives a heartbeat message from the manager node, it returns a heartbeat acknowledgment message HB_ACK to the manager node, indicating to the manager node that it is alive and can therefore remain in the cluster. If the manager node does not receive a heartbeat acknowledgment message from a computer node, it starts recovery measures immediately. Typically, the computer node with which a communication failure has been detected is removed from the cluster, and the cluster-specific activities of the node are reassigned to one or more other nodes A variety of different tasks may be performed by the cluster, and the actual applications may be distributed in a variety of ways within the cluster. One or more of the cluster nodes may appear as a single entity to an element external to the cluster. For example, if the computer nodes perform routing, one or more of the computer nodes may form a routing network element, as seen from the outside of the cluster. In another example, all computer nodes appear as a single entity to an external viewer.

If load sharing groups are utilized in the cluster, one or more of the computer nodes may further operate as an Internet Protocol Director (IPD) node, which is a load sharing control node routing incoming task requests within a load sharing group. In the example of FIG. 1, computer node 1102 operates as an IPD node receiving task requests from the outside of the computer cluster.

In the present invention, the intrinsic heartbeat mechanism of a computer cluster is utilized for collecting state information from the computer nodes. The data may be collected for the purposes of the cluster only, or for an entity external to the cluster, such as a network monitoring or management system 160 connected to the network. The heartbeat acknowledgment messages are used to carry state information from the cluster nodes to the manager node, which then stores the information in a Management Information Base (MIB) 150.

In one embodiment of the invention, the MIB is made available for both entities within the computer cluster and for entities external to the computer cluster. For example, the internal fault management of the cluster may utilize the data collected. The fault management logic may be distributed in the cluster with an agent 130 residing in the manager node so that the fault management system can read data from the MIB. In other words, the fault management system may comprise a client-server mechanism with the server part residing in the manager node and the client parts residing in the computer nodes. Another cluster entity capable of utilizing the MIB is a computer node that allocates incoming tasks to the computer nodes performing said tasks. In addition to the above-mentioned IPD node, any other cluster node may operate as such a load balancing entity.

Access to the MIB can be implemented in any known manner either directly or through the manager node, depending on whether the MIB forms an independent network node or whether it is connected to the manager node. The MIB may also be connected to a computer node other than the manager node.

Figure 2:
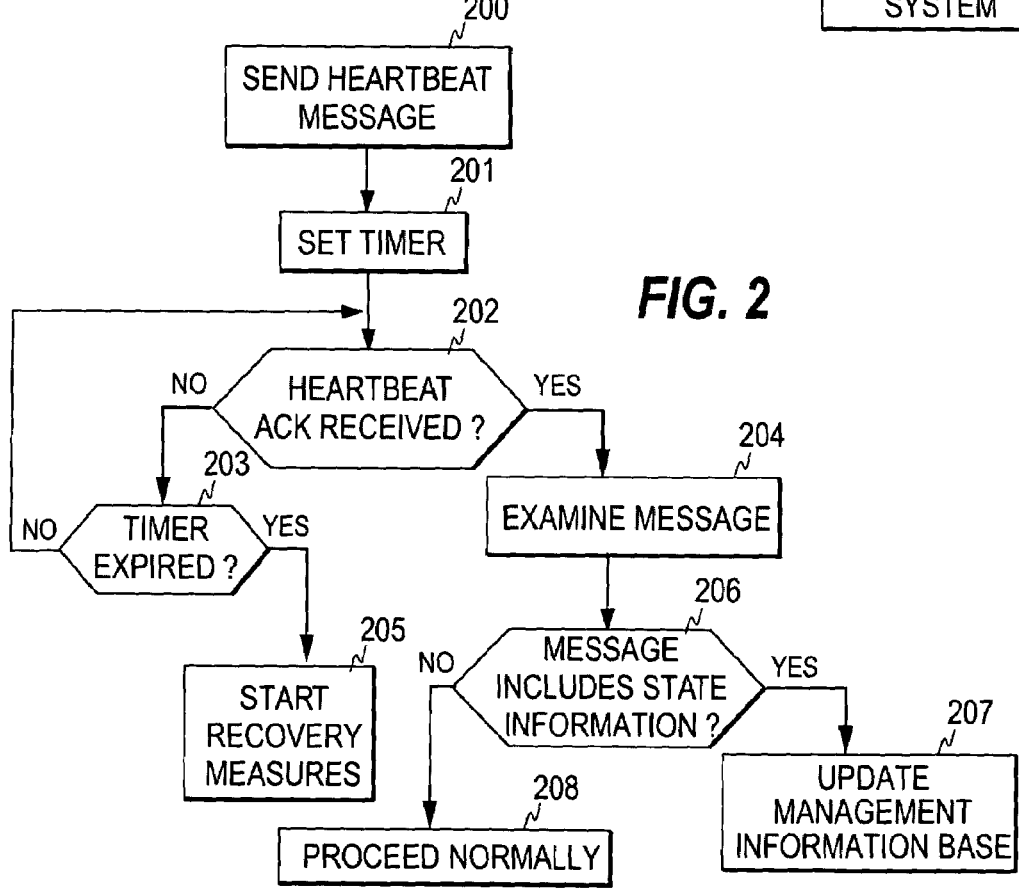
FIG. 2 is a flow diagram illustrating the basic operation of a manager node in view of one heartbeat message.

FIG. 2 is a flow diagram illustrating an example of the basic operation of the manager node with respect to one heartbeat message sent to another computer node. It is thus to be noted here that FIG. 2 illustrates the operation with respect to one heartbeat message sent, i.e., the periodic sending of the heartbeat messages is not shown in the figure. When the manager node transmits a heartbeat message, it sets a timer (step 201) and starts to monitor if a heartbeat acknowledgment message is received as a response from said another computer node (step 202). If this acknowledgment message arrives before the expiration of the timer, the manager node examines the message (step 204). If the manager node detects the message contains state information, it extracts the said information from the message and updates the MIB based on the information (step 207). In case of an acknowledgment message void of state information the manager node proceeds in a conventional manner.

If the timer expires before a heartbeat acknowledgment message is received, the manager node concludes that a communication failure has occurred with the computer node, and starts recovery measures (step 205). In practice, the time period measured by the timer is so long that more than one heartbeat messages can be transmitted within that period. A heartbeat acknowledgment received for any of these messages then triggers the process to jump to step 204. Normally the manager node proclaims a computer node to be faulty when N successive heartbeat messages remain without an acknowledgment from that computer node. The manager node may thus be allowed to lose a given number of heartbeat messages before the recovery measures are started. Particularly in case of the UDP (User Datagram Protocol), which is commonly used for carrying hearbeat messages, messages may be lost without a real problem existing in the network. In view of the above, FIG. 2 is to be seen merely as an illustration of the processing principles of the incoming heartbeat acknowledgment messages in the manager node, while the actual implementation of the relevant manager node algorithm may vary in many ways.

Figure 3A:
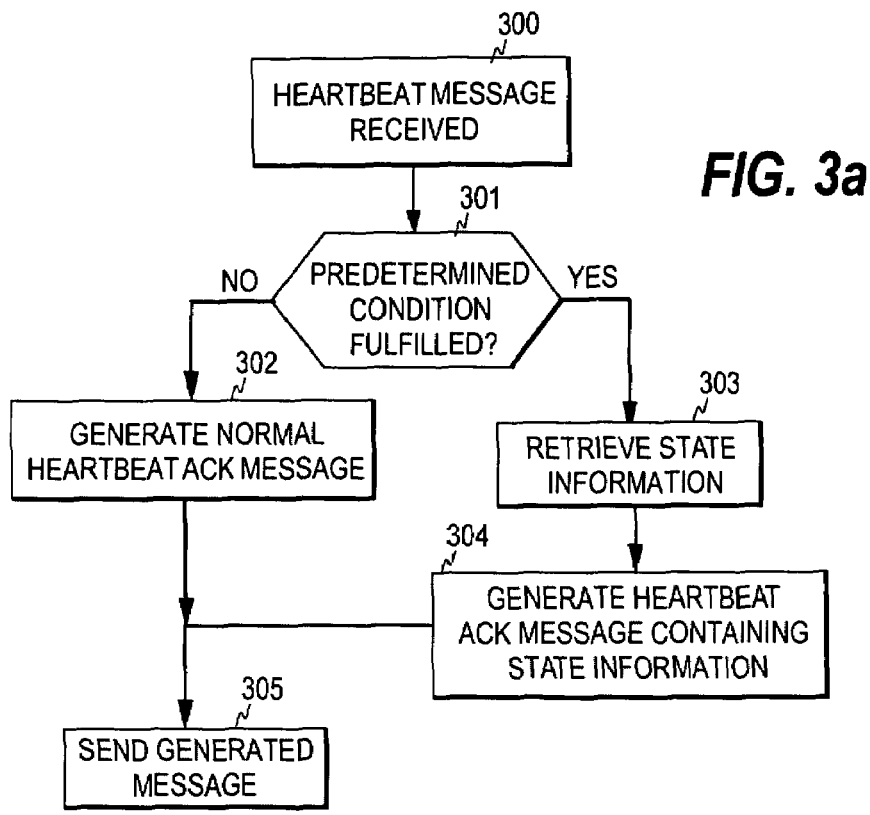
FIG. 3a is a flow diagram illustrating one embodiment for sending state information from a computer node.

FIG. 3a is a flow diagram illustrating an example of the operation of a computer node with respect to one heartbeat message received from the manager node. When the heartbeat message is received, the computer node examines (step 301) whether a predetermined condition is fulfilled. This predetermined condition is set in order not to transfer state information unnecessarily in the acknowledgment messages. If the condition is fulfilled, the computer node retrieves state information from its memory (step 303) and generates a heartbeat acknowledgment message containing the state information retrieved. If the predetermined condition is not fulfilled, the computer node generates a normal heartbeat acknowledgment message, i.e. a heartbeat acknowledgment message without state information (302). The generated message is then sent back to the manager node (step 305).

The predetermined condition set for the retrieval of the state information is typically such that a certain minimum time period must have passed since the latest transmission of state information to the manager node. If this time limit has been exceeded, new state information is retrieved and inserted into the heartbeat acknowledgment message. Otherwise a normal heartbeat acknowledgment message is sent. In order to detect when the time limit has been exceeded, the computer node may start a counter at step 305. The current value of the counter is then examined at step 301 in connection with a subsequent heartbeat message. The computer node thus typically sends both normal heartbeat acknowledgment messages and heartbeat acknowledgment messages containing the state information, the proportions of these two message types depending on the rate of the heartbeat messages received.

The predetermined condition set for the retrieval of the state information may also consist of several sub-conditions that must be fulfilled before state information is retrieved. If the load of the computer node is used as such a sub-condition, the retrieval of the state information could occur, for example, only if both a certain minimum time period has passed since the latest transmission of state information and the current load of the computer node is below a certain maximum level.

Figure 3B:
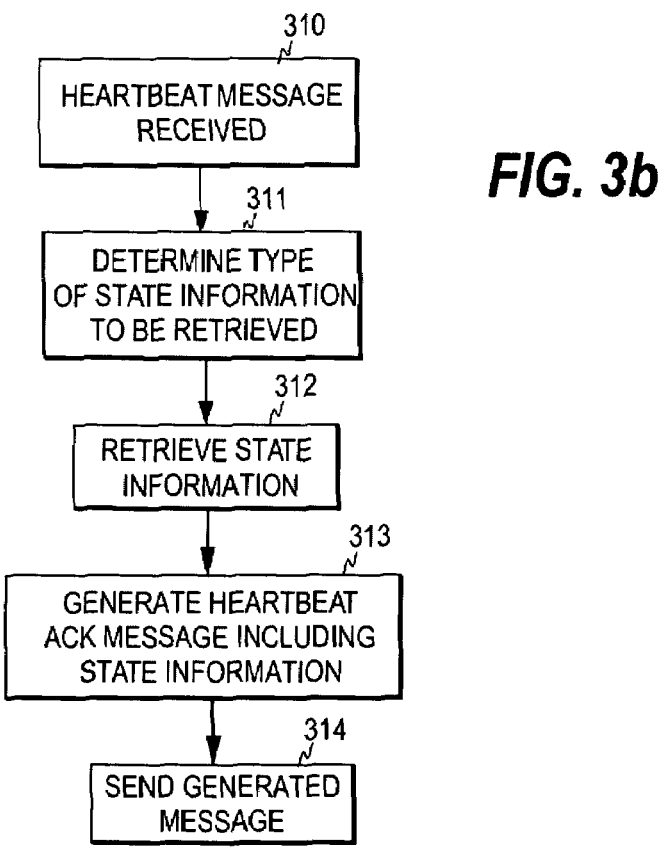
FIG. 3b is a flow diagram illustrating another embodiment for sending state information from a computer node.

As shown in FIG. 3b, it is also possible that the node determines, in response to the reception of a heartbeat message, the type of state information to be retrieved (step 311). Different types of information may thus be carried by successive heartbeat acknowledgment messages. For example, if heartbeat messages are transmitted frequently enough, a certain set of parameters may be carried by N successive heartbeat acknowledgment messages, the same set being again transmitted by the next N heartbeat acknowledgment messages, and so on. Furthermore, certain information (parameters) may be transferred less frequently than other information.

The state information retrieved from the memory depends generally on the application running on the computer node. However, certain basic parameters that relate to the operating system of the computer node are the same for all computer nodes. These parameters include figures indicating the CPU idle time and the number of certain I/O operations, for example. Basically, the state information can be divided into two groups: the parameters relating to the performance of the applications and the parameters relating to the performance and/or state of the node platform.

Figure 4:
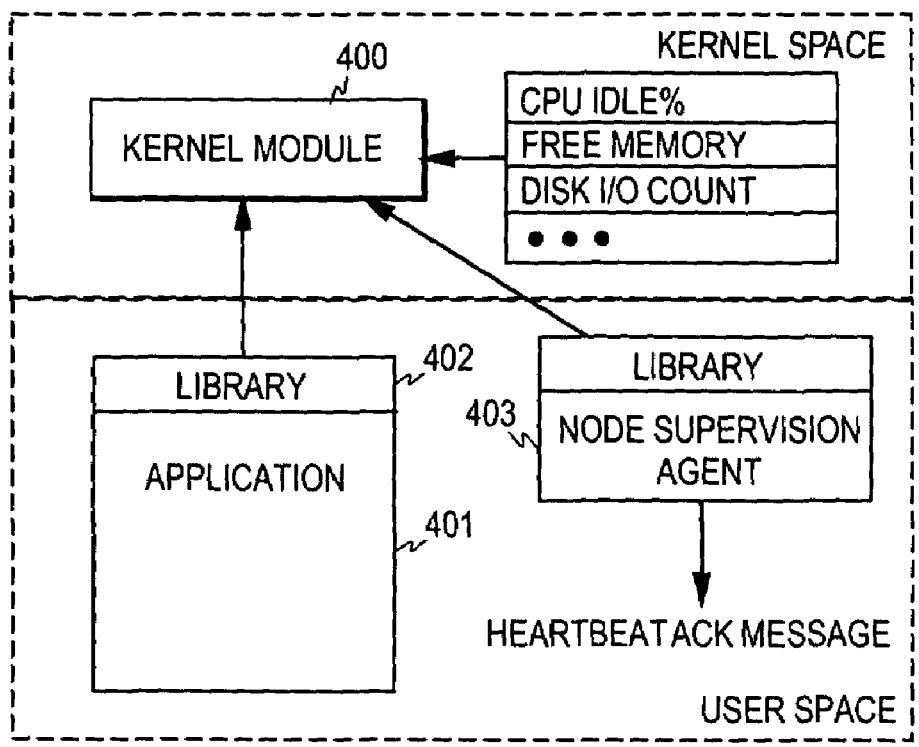
FIG. 4 is a schematic diagram illustrating the collection of state information in a computer node.

FIG. 4 illustrates an example of the software architecture of the heartbeat acknowledgment generation in a computer node. A kernel module 400 residing in the kernel space receives the parameters relating to the operating system directly from the kernel space of the computer node. In the user-space, where the applications are executed, each application 401 may have a library 402 through which it can write the relevant parameters to the kernel module. A supervision agent 403 residing in the user space retrieves the state information from the kernel module if the predetermined condition is fulfilled, and constructs the heartbeat acknowledgment message containing the information retrieved. In the embodiment of FIG. 4, the storage of the state information is thus implemented in the operating system, which provides a faster operation. However, the state information may also be stored in a mass memory, such as a disk.

Figure 5:
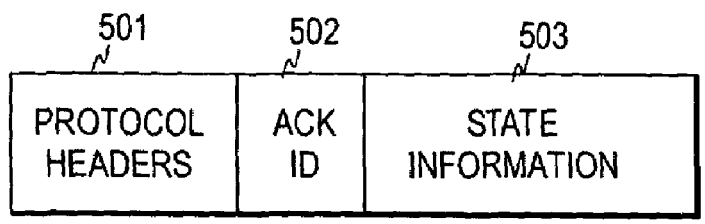
FIG. 5 is a schematic presentation of a heartbeat message according to the invention.

FIG. 5 illustrates a general structure of the heartbeat acknowledgment message containing state information. The message comprises three successive portions: a header portion 501 that includes the protocol headers of the relevant protocols (such as Ethernet, IP and TCP/DP headers), an acknowledgment identifier 502, and a payload portion 503 that contains the state information retrieved in the computer node. The message is thus otherwise similar to a conventional heartbeat acknowledgment message, but it includes a payload portion that contains the state information. In one embodiment of the invention the payload portion is encoded by using ASN.1 (Abstract Syntax Notation One) and PER (Packed Encoding Rules) coding. In this way the state information can be packed efficiently and more information can be inserted into the same message space. Depending on the protocols used, part of the state information may be transmitted without causing any extra load in the network. This is the case if the length of a conventional heartbeat message is shorter than the length of the minimum transmission unit, in which case state information may be used as the padding bits.

The load increase caused by a heartbeat acknowledgment message of the invention is relatively small as compared to the load caused by a conventional heartbeat acknowledgment message. This is because the overhead caused by a longer message is relatively low, since in short messages the protocol header takes a major part of the transmitted message. Furthermore, as messages shorter than a minimum message length are normally filled up, they may now be filled with the state information. In this way part of the state information may be transferred without causing extra load in the network. The extra load caused by the method of the invention therefore also depends on the environment where the invention is applied. In an Ethernet network, for example, this minimum message lenght is 64 bytes, which is more than portions 501 and 502 require.

Although the invention was described above with reference to the examples shown in the appended drawings, it is obvious that the invention is not limited to these, but may be modified by those skilled in the art without departing from the scope and spirit of the invention. For example, it is not necessary to check whether a normal heartbeat acknowledgment message or a heartbeat acknowledgment message containing state information is to be sent, but an acknowledgment message containing state information can be sent in response to every heartbeat message.

We claim:

1. A method comprising:
   receiving, in a second computer node of a computer network, periodic heartbeat messages from a first computer node of the computer network, the second computer node including at least one resource for performing at least one network-specific task;
   transmitting heartbeat acknowledgement messages from the second computer node to the first computer node as responses to the heartbeat messages, wherein each heartbeat acknowledgement message indicates to the first computer node that the second computer node is operative within the computer network and wherein the heartbeat acknowledgement messages form a sequence of heartbeat acknowledgement messages transmitted from the second computer node to the first computer node;
   examining, in the second computer node, whether state information is to be retrieved for a heartbeat acknowledgement message to be transmitted to the first computer node, the heartbeat acknowledgement message belonging to the sequence of heartbeat acknowledgement messages and the state information being indicative of current ability of the at least one resource to perform the at least one network-specific task;
   retrieving the state information for the heartbeat acknowledgement message when the examining indicates that the state information is to be retrieved; and
   sending the retrieved state information in the heartbeat acknowledgement messages to the first computer node for storing the state information in the first computer node,
   wherein the examining is performed for each heartbeat acknowledgement message to be transmitted to the first computer node, thereby transferring a sequence of the state information within the sequence of heartbeat acknowledgement messages.

2. The method according to claim 1, wherein the examining includes examining whether a predetermined condition is fulfilled.

3. The method according to claim 2, wherein
   the retrieving state information and the sending of the retrieved state information are performed when the examining indicates that the predetermined condition is fulfilled, and
   the transmitting comprises transmitting a heartbeat acknowledgement message without state information when the examining indicates that the predetermined condition fails to be fulfilled, wherein the heartbeat acknowledgement message is any of the heartbeat acknowledgement messages.

4. The method according to claim 1, further comprising determining a type of state information to be retrieved for a heartbeat acknowledgement message.

5. An apparatus comprising:
   at least one resource configured to perform at least one network-specific task;
   a receiver configured to receive periodic heartbeat messages from another computer node; and
   a transmitter configured to transmit heartbeat acknowledgement messages to the other computer node as responses to the periodic heartbeat messages, wherein each heartbeat acknowledgement message indicates to the other node that the computer node is operative within the computer network and wherein the heartbeat acknowledgement messages form a sequence of heartbeat acknowledgement messages,
   wherein the transmitter comprises an examining unit configured to examine whether state information is to be retrieved for a heartbeat acknowledgement message to be transmitted to the other computer node, the heartbeat acknowledgement message belonging to the sequence of heartbeat acknowledgement messages and the state information being indicative of current ability of the at least one resource to perform the at least one network-specific task;
   the transmitter further comprises a retrieving unit configured to retrieve, upon indication by the examining unit, state information for the heartbeat acknowledgement message and a sending unit, responsive to the retrieving unit, configured to send the retrieved state information in the heartbeat acknowledgement message to said other computer node,
   wherein the examining unit is configured to operate for each heartbeat acknowledgement message to be transmitted to said other computer node, thereby transferring a sequence of the state information within the sequence of heartbeat acknowledgement messages to the other computer node.

6. The apparatus according to claim 5, wherein retrieval of the state information and the sending of the retrieved state information are performed when the examining unit indicates that the predetermined condition is fulfilled, and
   wherein the transmission of each heartbeat acknowledgement message comprises a transmission of a heartbeat acknowledgement message without state information when the examining indicates that the predetermined condition fails to be fulfilled, wherein the heartbeat acknowledgement message is any of the heartbeat acknowledgement messages.

7. A method comprising:
   transmitting periodic heartbeat messages from a first computer node of a computer network to a second computer node of the computer network, the second computer node including at least one resource for performing at least one network-specific task;
   receiving, in the first computer node, heartbeat acknowledgement messages from the second computer node as responses to the heartbeat messages, wherein the heartbeat acknowledgement messages form a sequence of heartbeat acknowledgement messages and wherein each heartbeat acknowledgement message of the sequence indicates to the first computer node that the second computer node is operative within the computer network;
   examining, in the first computer node, whether a heartbeat acknowledgement message comprises state information indicative of current ability of said at least one resource to perform said at least one network-specific task, wherein the heartbeat acknowledgement message is any of the heartbeat acknowledgement messages of the sequence; and
   storing the state information for managing the computer network.

8. The method according to claim 7, further comprising storing the state information in a management information base.

9. The method according to claim 8, further comprising transferring data from the management information base to an entity external to the computer network.

10. The method according to claim 7, wherein receiving the heartbeat acknowledgement message further comprises removing the second computer node from the network when no heartbeat acknowledgement message is received within a predetermined period of time.

11. An apparatus comprising:
a transmitter configured to transmit periodic heartbeat messages to a second computer node of a computer network, the second computer node including at least one resource configured to perform at least one network-specific task;
a receiver configured to receive heartbeat acknowledgement messages from the second computer node as responses to the heartbeat messages, wherein the heartbeat acknowledgement messages form a sequence of heartbeat acknowledgement messages and wherein each heartbeat acknowledgement message of the sequence indicates that the second computer node is operative within the computer network;
an examining unit configured to examine whether a heartbeat acknowledgement message comprises state information indicative of current ability of the at least one resource to perform said at least one network-specific task, wherein the heartbeat acknowledgement message is any of the heartbeat acknowledgement messages of the sequence; and
a storing unit configured to store the state information for managing the computer network.

12. The apparatus according to claim 11, wherein the computer node is operably connected to a management information base for storing the state information sent to the first computer node.

13. The apparatus according to claim 11, further comprising a network interface configured to communicate with an access unit configured to access the management information base.

14. An apparatus comprising:
at least one resource means for performing at least one network-specific task;
receiving means for receiving periodic heartbeat messages from another computer node; and
transmission means for transmitting heartbeat acknowledgement messages to the other computer node as responses to the periodic heartbeat messages, wherein each heartbeat acknowledgement message indicates to the other computer node that the computer node is operative within a computer network and wherein the heartbeat acknowledgement messages form a sequence of heartbeat acknowledgement messages,
wherein the transmission means comprises examining means for examining whether state information is to be retrieved for a heartbeat acknowledgement message to be transmitted to the other computer node, wherein the heartbeat acknowledgement message belongs to the sequence of heartbeat acknowledgement messages and wherein the state information is indicative of current ability of the at least one resource to perform the at least one network-specific task,
wherein the transmission means also comprises retrieving means for retrieving, upon indicating by the examining means, the state information for the heartbeat acknowledgement message and sending means, responsive to the retrieving means, for sending the retrieved state information in the heartbeat acknowledgement message to said other computer node,
wherein the examining means are configured to operate for each heartbeat acknowledgement message to be transmitted to the other computer node, thereby transferring a sequence of the state information within the sequence of heartbeat acknowledgment messages.

15. An apparatus comprising:
transmitting means for transmitting periodic heartbeat messages to at least one second computer node of a computer network, the second computer node including at least one resource for performing at least one network-specific task;
reception means for receiving heartbeat acknowledgement messages from the at least one second computer node as responses to the heartbeat messages, wherein the heartbeat acknowledgement messages form a sequence of heartbeat acknowledgement messages and wherein each heartbeat acknowledgement message indicates that the second computer node is operative within the computer network;
examining means for examining whether a heartbeat acknowledgement message comprises state information indicative of current ability of the at least one resource to perform said at least one network-specific task, wherein the heartbeat acknowledgement message is any of the heartbeat acknowledgement messages of the sequence; and
storing means for storing the state information for managing the computer network.

* * * * *